United States Patent
Arai et al.

(10) Patent No.: US 8,414,696 B2
(45) Date of Patent: Apr. 9, 2013

(54) NON-AQUEOUS PIGMENT INK

(75) Inventors: Masakatsu Arai, Ibaraki-ken (JP); Shin-Ichirou Shimura, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 330 days.

(21) Appl. No.: 12/850,179

(22) Filed: Aug. 4, 2010

(65) Prior Publication Data

US 2011/0045257 A1   Feb. 24, 2011

(30) Foreign Application Priority Data

Aug. 19, 2009   (JP) .................. P2009-189808

(51) Int. Cl.
*C09D 11/02*   (2006.01)
(52) U.S. Cl.
USPC .................. 106/31.78; 106/31.6; 106/31.85
(58) Field of Classification Search ............... 106/31.78, 106/31.6, 31.85
See application file for complete search history.

(56) References Cited

U.S. PATENT DOCUMENTS

| | | | | |
|---|---|---|---|---|
| 5,837,046 A | * | 11/1998 | Schofield et al. | 106/31.86 |
| 5,973,027 A | * | 10/1999 | Howald et al. | 523/160 |
| 8,268,957 B2 | | 9/2012 | Liu et al. | |

FOREIGN PATENT DOCUMENTS

| CN | 101410436 A | 4/2009 |
|---|---|---|
| JP | 2008-274232 A | 11/2008 |

* cited by examiner

*Primary Examiner* — Margaret Moore
(74) *Attorney, Agent, or Firm* — Nath, Goldberg & Meyer; Jerald L. Meyer

(57) ABSTRACT

A non-aqueous pigment ink which enables the ink repellency of the nozzle plate surface of the print head to be favorably maintained, while also enabling a superior image density to be obtained. The non-aqueous pigment ink includes a pigment, a pigment dispersant and a non-aqueous solvent, wherein the ink comprises a copolymer of vinylpyrrolidone and an alkene of 10 to 40 carbon atoms as the pigment dispersant, and also comprises a pigment derivative.

20 Claims, No Drawings

NON-AQUEOUS PIGMENT INK

CROSS REFERENCE TO RELATED APPLICATIONS

This Application is based upon and claims the benefit of priority from prior Japanese Patent Applications No. 2009-189808 filed on Aug. 19, 2009, the entire contents of which are incorporated by reference herein.

BACKGROUND OF THE INVENTION

1. Field of the Invention

The present invention relates to a non-aqueous pigment ink.

2. Description of the Related Art

An inkjet recording system is a printing system in which printing is conducted by spraying a liquid ink with a high degree of fluidity from very fine nozzles, and adhering that ink to a recording medium such as a sheet of paper. These systems enable the printing of high-resolution, high-quality images at high speed and with minimal noise, using a comparatively inexpensive printing apparatus, and are rapidly becoming widespread.

The coloring materials for the inks used in these inkjet recording systems can be broadly classified into materials that use pigments and materials that use dyes. Of these, there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. Non-aqueous inks that do not use water as the ink solvent, including solvent-based inks that use a volatile solvent as the main constituent and oil-based inks that use a non-volatile solvent as the main constituent, exhibit superior stability within the printer (such as intermittent dischargeability and discharge recovery following standing idle for a long period), cause no curling of the printed paper and have a short ink penetration and drying time, and are therefore attracting considerable attention.

The nozzle plate surface of the print head is often subjected to an ink repellent treatment using a fluorine-based process or the like, but because non-aqueous inks exhibit comparatively high wettability of the nozzle plate surface, the nozzle plate surface tends to be wet relatively easily by the ink. If ink adheres to the nozzle plate surface, then the adhered ink may hinder the discharge of ink droplets. Moreover, the adhered ink may drip onto the paper and soil the printed image.

On the other hand, the print head nozzles used in inkjet printing systems have a very small diameter opening which can sometimes become blocked, and therefore the printing system is usually fitted with a cleaning mechanism. This cleaning is typically conducted by discharging a small amount of ink, suctioning the ink off with a suction device, and then wiping the plate surface with a wiper blade. Abrasion of the nozzle plate surface by the wiper blade tends to cause a deterioration in the ink repellency of the nozzle plate surface.

Patent Document 1 discloses an oil-based ink comprising an ester-based solvent as the solvent, in which by adding a salt of a long-chain polyamide and a polar acid ester in an amount of not less than 1% by mass relative to the total mass of the ink, wetting of the nozzle plate surface by the ink is suppressed. However, in Patent Document 1, no investigation was made regarding deterioration in the ink repellency upon performing cleaning.

Furthermore, in a non-aqueous pigment ink, the pigment tends to penetrate readily, together with the solvent, into the interior of the recording medium, and as a result, the image density tends to deteriorate.

Patent Document 1: Japanese Patent Laid-Open No. 2008-274232

SUMMARY OF THE INVENTION

The present invention has an object of providing a non-aqueous pigment ink which enables the ink repellency of the nozzle plate surface of the print head to be favorably maintained, while also enabling a superior image density to be obtained.

A first aspect of the present invention provides a non-aqueous pigment ink comprising a pigment, a pigment dispersant and a non-aqueous solvent, wherein the ink comprises a copolymer of vinylpyrrolidone and an alkene of 10 to 40 carbon atoms as the pigment dispersant, and also comprises a pigment derivative.

DETAILED DESCRIPTION OF THE PREFERRED EMBODIMENTS

A description of embodiments according to the present invention is presented below, but the examples within these embodiments in no way limit the scope of the present invention.

The non-aqueous pigment ink according to the present invention (hereafter also referred to as simply "the ink") comprises a pigment, a pigment dispersant (hereafter also referred to as simply "the dispersant") and a non-aqueous solvent, wherein the ink comprises a copolymer of vinylpyrrolidone and an alkene of 10 to 40 carbon atoms as the pigment dispersant, and also comprises a pigment derivative. As a result, the ink repellency of the nozzle plate surface of the print head can be favorably maintained, and a superior image density can be obtained.

By including the pigment derivative, the ink according to the present invention is able to prevent deterioration in the ink repellency of the nozzle plate surface, and particularly deterioration in the nozzle plate surface caused by the cleaning mechanism. Further, by including a copolymer of vinylpyrrolidone and an alkene of 10 to 40 carbon atoms as the pigment dispersant, the stability of the ink can be favorably maintained and a superior image density can be obtained.

The ink may be any color, and examples of the pigment include organic pigments such as azo-based pigments, phthalocyanine-based pigments, dye-based pigments, condensed polycyclic pigments, nitro-based pigments and nitroso-based pigments (such as brilliant carmine 6B, lake red C, Watchung red, disazo yellow, Hansa yellow, phthalocyanine blue, phthalocyanine green, alkali blue, and aniline black); inorganic pigments, including metals such as cobalt, iron, chrome, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black. Any one of these pigments may be used individually, or two or more different pigments may be used in combination.

From the viewpoints of dispersibility and storage stability, the average particle size of the pigment is preferably not more than 300 nm, and is more preferably 150 nm or less. In this description, the average particle size of the pigment refers to the value measured using a dynamic light-scattering particle size distribution measurement apparatus LB-500 manufactured by Horiba, Ltd.

The amount of the pigment within the ink is typically within a range from 0.01 to 20% by mass, and from the viewpoints of the print density and the ink viscosity, is preferably within a range from 3 to 15% by mass.

The ink according to the present invention comprises a pigment derivative. In this description, the pigment derivative describes a compound produced by introducing a substituent into a pigment structure. In the ink, the pigment backbone of the pigment derivative adsorbs to the pigment surface within the ink, and the substituent portion of the pigment derivative aligns with the solvent in the ink, thus generating a pigment dispersion effect within the ink.

In the present invention, it was discovered that the pigment derivative also has the effect of favorably maintaining the ink repellency of the nozzle plate surface. When pigment particles make direct contact with the nozzle plate surface, the resulting rubbing action can cause a deterioration in the ink repellency of the nozzle plate surface. Although merely speculation, it is thought that by adding the pigment derivative to the ink, the pigment particles become coated by the pigment derivative, and because any contact with the nozzle plate surface occurs via the comparatively soft pigment derivative, any rubbing of the nozzle plate surface is suppressed, enabling prevention of any deterioration in the ink repellency. This type of pigment derivative effect has been unknown until now.

Examples of materials that can be used favorably as the pigment derivative include compounds in which a functional group such as a carboxyl group, sulfonic acid group, amino group, carbonyl group or sulfonyl group or the like has been added to the structure of a phthalocyanine-based pigment, azo-based pigment, anthraquinone-based pigment or quinacridone-based pigment or the like, as well as salts of these compounds. Any one of these pigment derivatives may be used individually, or two or more may be used in combination.

Examples of commercially available pigment derivatives that can be used favorably include Solsperse 5000 (a phthalocyanine derivative, manufactured by The Lubrizol Corporation) and BYK-Synergist 2100 (a phthalocyanine derivative, manufactured by BYK Japan Co., Ltd.). These products may be used individually or in combination.

The pigment derivative preferably has a color that is the same as, or similar to, that of the pigment. For example, in the case of a black ink or cyan ink, the pigment derivative is preferably a phthalocyanine pigment derivative.

The total amount of the pigment derivative, expressed as a mass ratio relative to a value of 1 for the pigment, is preferably within a range from 0.015 to 0.150, more preferably from 0.020 to 0.100, and still more preferably from 0.030 to 0.080. Expressed as a blend amount relative to the total mass of the ink, the amount of the pigment derivative is preferably within a range from 0.1 to 1.1% by mass, and more preferably from 0.25 to 0.60% by mass.

If the amount of the pigment derivative is too large, then the dispersibility of the pigment within the ink tends to deteriorate, and the stability of the ink within the printer may deteriorate. In contrast, if the amount of the pigment derivative is too small, then satisfactorily maintaining the ink repellency of the nozzle plate surface may become difficult. Accordingly, the amount of the pigment derivative is preferably set within the range described above.

The ink according to the present invention comprises a copolymer of vinylpyrrolidone (VP) and an alkene of 10 to 40 carbon atoms as the pigment dispersant (hereafter this copolymer is also referred to as an "alkylated polyvinylpyrrolidone (PVP)").

Specific examples of the pigment dispersant include copolymers of VP and an alkene selected from among decene, undecene, dodecene, tridecene, tetradecene, pentadecene, hexadecene, heptadecene, octadecene, nonadecene, eicosene, docosene and triacontene and the like. Of these, copolymers formed with an alkene of 12 to 24 carbon atoms are preferred from the viewpoint of dispersion stability, and the use of a VP-hexadecene copolymer, VP-eicosene copolymer or VP-triacontene copolymer or the like is particularly desirable. The copolymer may include a plurality of different alkenes.

In terms of suitably controlling the polarity of the copolymer, the copolymerization ratio (molar ratio) of the VP and the alkene is preferably such that VP: alkene is not less than 1:9 but less than 5:5, and is more preferably within a range from 2:8 to 4:6.

The molecular weight (the weight average molecular weight measured by GC and referenced against standard polystyrenes) of the alkylated PVP is preferably within a range from 3,000 to 50,000, and more preferably from 5,000 to 30,000.

Examples of commercially available alkylated PVP copolymers include VP-hexadecene copolymers marketed under the product names Antaron V-216 (manufactured by ISP Corporation) and Unimer U-151 (manufactured by Induchem AG), and VP-eicosene copolymers marketed under the product names Antaron V-220 and Ganex V-220 (manufactured by ISP Corporation) and Unimer U-15 (manufactured by Induchem AG).

The ink may comprise a plurality of different alkylated-PVP copolymers.

The ink according to the present invention comprises a pigment derivative, but inclusion of a pigment derivative within an ink can cause precipitation of foreign matter, leading to a deterioration in the ink stability. In order to counter this problem in the present invention, the inventors investigated a multitude of components able to be included within ink formulations, and discovered that by adding an alkylated PVP as a pigment dispersant together with the pigment derivative, the stability of the ink could be favorably maintained.

Furthermore, including an alkylated PVP as the pigment dispersant enables a printed item to be obtained that exhibits superior image density and is resistant to show-through. Although merely speculation at this point, the reason that this effect is obtained is thought to be as follows. Namely, although a homopolymer PVP has a high polarity and is insoluble in non-aqueous solvents, by alkylating the PVP by performing a copolymerization with an alkene of 10 to 40 carbon atoms, the resulting copolymer becomes soluble in non-aqueous solvents. However, it is thought that although the alkylated PVP is able to be dissolved in non-aqueous solvents, it remains polar, and therefore the affinity of the alkylated PVP for the non-aqueous solvent is not overly high, meaning solvent release (the separation of the pigment and the solvent) tends to occur rapidly, which facilitates retention of the pigment on the paper. In other words, achieving stable dispersion of the pigment within the non-aqueous solvent requires that the dispersant itself is soluble in the solvent, but if the affinity between the dispersant and the non-aqueous solvent is too high, then the solvent release properties tend to deteriorate, and the pigment tends to penetrate into the interior of the paper together with the solvent, resulting in reduced image density.

The ink according to the present invention preferably also comprises a nitrogen-containing graft copolymer having polyester side chains (hereafter also referred to as a "graft PN") as a pigment dispersant. This enables the pigment dispersibility to be maintained more favorably.

It is thought that by including this other pigment dispersant in the ink together with the aforementioned alkylated PVP, the pigment dispersibility can be maintained more favorably. In some cases, interactions between the alkylated PVP and the pigment derivative can make it impossible to obtain satisfactory pigment dispersibility. However, it was discovered that by also including a graft PN, favorable pigment dispersibility could be maintained even when an alkylated PVP and a pigment derivative were both included within the ink formulation.

The nitrogen-containing graft copolymer having polyester side chains is a copolymer having a comb-shaped structure in which the grafted chains are polyester and the main chain is a nitrogen-containing polymer.

Examples of such copolymers include polymers comprising a main chain containing a plurality of nitrogen atoms such as a polyalkyleneimine, wherein a plurality of side chains are bonded to these nitrogen atoms via amide linkages, and these side chains are polyester chains. Specific examples of these types of polymers are disclosed in Japanese Patent Laid-Open No. H05-177123 (U.S. Pat. No. 4,645,611).

The weight average molecular weight of the nitrogen-containing polymer that constitutes the main chain is preferably not more than 600,000, and the polymer preferably comprises a plurality of side chains, with the polymerization degree of the side chains preferably within a range from approximately 3 to 80, although neither of these conditions is limiting. The main chain is preferably a polyalkyleneimine such as a polyethyleneimine, and the polyalkyleneimine may be either a straight chain or a branched chain, but is preferably a branched chain. The side chains are preferably polymers composed of (carbonyl-(C3 to C6-alkylene)oxy group) units, and are preferably bonded to the main chain via amide linkages or salt-bridging groups.

Examples of commercial products that can be used favorably as the graft PN include Solsperse 28000, Solsperse 11200 and Solsperse 13940, manufactured by The Lubrizol Corporation.

The ink may comprise a plurality of different graft PN copolymers.

At least one other dispersant besides the aforementioned alkylated PVP and graft PN is preferably also included as a pigment dispersant. For example, by also using a dispersant having a higher degree of affinity for non-aqueous solvents than the alkylated PVP (namely, a dispersant with a lower polarity than the alkylated PVP), the dispersion stability of the pigment within the ink can be improved.

There are no particular restrictions on other pigment dispersants that can be used, provided they are capable of stably dispersing the pigment within the solvent. Examples of preferred pigment dispersants include hydroxyl group-containing carboxylate esters, salts of long-chain polyaminoamides and high molecular weight acid esters, salts of high molecular weight polycarboxylic acids, salts of long-chain polyaminoamides and polar acid esters, high molecular weight unsaturated acid esters, high molecular weight copolymers, modified polyurethanes, modified polyacrylates, polyetherester-type anionic activators, naphthalenesulfonic acid formalin condensate salts, polyoxyethylene alkyl phosphate esters, polyoxyethylene nonylphenyl ethers, polyester polyamines and stearylamine acetate, and of these, the use of a polymer dispersant is particularly desirable.

The total amount of the pigment dispersant, expressed as a mass ratio relative to a value of 1 for the pigment, is preferably within a range from 0.2 to 1.0. The mass of the alkylated PVP is preferably not less than 0.2 relative to a value of 1 for the pigment, and the mass of the graft PN is preferably not less than 0.1 relative to a value of 1 for the pigment. These values all represent solid fraction mass values.

The total amount of the pigment dispersant (solid fraction) within the ink is preferably within a range from 1 to 15% by mass, and is more preferably from 2 to 10% by mass.

The mass ratio between the copolymer of vinylpyrrolidone and an alkene of 10 to 40 carbon atoms, and the nitrogen-containing graft copolymer having polyester side chains, expressed as a ratio of the respective solid fractions, is preferably within a range from 1:0.10 to 1:0.85, more preferably from 1:0.12 to 1:0.80, and still more preferably from 1:0.17 to 1:0.75.

If the mass ratio of the alkylated PVP is too large and the mass ratio of the graft PN is too small, then the pigment dispersibility may deteriorate, causing a deterioration in the storage stability and the stability within the printer. If the mass ratio of the alkylated PVP is too small and the mass ratio of the graft PN is too large, then the pigment derivative tends to be prone to precipitation, particularly at low temperature, resulting in a deterioration in the low-temperature storage stability and an associated deterioration in the stability within the printer. Accordingly, ensuring that the mass ratio between the alkylated PVP and the graft PN satisfies the range mentioned above enables the storage stability, and particularly the low-temperature storage stability, and the stability of the ink within the printer to be better maintained.

Moreover, the mass ratio between the pigment derivative and the alkylated PVP is preferably within a range from 1:2 to 1:20, and more preferably from 1:4 to 1:10. A mass ratio within this range ensures favorable low-temperature storage stability.

The ink according to the present invention comprises a non-aqueous solvent. Here, the term "non-aqueous solvent" refers to non-polar organic solvents and polar organic solvents for which the 50% distillation point is at least 150° C. The "50% distillation point" is measured in accordance with JIS K0066 "Test Methods for Distillation of Chemical Products" and refers to the temperature at which 50% by weight of the solvent is evaporated.

For example, examples of preferred non-polar organic solvents include aliphatic hydrocarbon solvents, alicyclic hydrocarbon solvents and aromatic hydrocarbon solvents. Specific examples of the aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by Nippon Oil Corporation; and Isopar G, Isopar H, Isopar L, Isopar M, Exxsol D40, Exxsol D80, Exxsol D100, Exxsol D130 and Exxsol D140, all manufactured by Exxon Mobil Corporation. Specific examples of the aromatic hydrocarbon solvents include Nisseki Cleansol G (alkylbenzene) manufactured by Nippon Oil Corporation and Solvesso 200 manufactured by Exxon Mobil Corporation.

Examples of solvents that can be used as the polar organic solvent include ester-based solvents, alcohol-based solvents, higher fatty acid-based solvents, ether-based solvents, and mixtures thereof. For example, one or more solvents selected from the group consisting of ester-based solvents composed of an ester of a higher fatty acid of 8 to 20 carbon atoms and an alcohol of 1 to 24 carbon atoms, higher alcohols of 8 to 24 carbon atoms, and higher fatty acids of 8 to 20 carbon atoms can be used favorably.

Specific examples of preferred polar organic solvents include ester-based solvents such as methyl laurate, isopropyl laurate, isopropyl myristate, isopropyl palmitate, isostearyl palmitate, isooctyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol, oleyl alcohol, hexyldecanol, octyldodecanol and decyltetradecanol; higher fatty acid-based solvents such as nonanoic acid, isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether and propylene glycol dibutyl ether.

The ink of the present invention preferably comprises a higher alcohol of 8 to 24 carbon atoms as the non-aqueous solvent. This enables the ink repellency of the nozzle plate surface to be further improved. It is thought that because the higher alcohol exhibits a high level of affinity for the pigment derivative, precipitation of the pigment derivative within the ink is inhibited, thereby ensuring that the ink repellency is favorably maintained. This precipitation-inhibiting action is particularly effective at low temperatures.

The number of carbon atoms within the higher alcohol is preferably within a range from 8 to 24, more preferably from 10 to 22, and still more preferably from 12 to 20. Examples of this type of higher alcohol include those alcohols listed among the above alcohol-based solvents that contain 8 to 24 carbon atoms. Of these, isomyristyl alcohol (number of carbon atoms: 14), isocetyl alcohol (number of carbon atoms: 16) and isostearyl alcohol (number of carbon atoms: 18) and the like are particularly preferred.

In terms of ensuring favorable dischargeability, the amount of the higher alcohol of 8 to 24 carbon atoms, relative to the total mass of the ink, is preferably not more than 20% by mass, more preferably not more than 15% by mass, and still more preferably 10% by mass or less.

In addition to the components described above, the ink may also include, as required, any of the various additives typically used within the field, provided the inclusion of these additives does not impair the object of the present invention.

Specific examples of these additives include anionic surfactants, cationic surfactants, amphoteric surfactants, nonionic surfactants, or polymer-based, silicone-based or fluorine-based surfactants, which may be added to the ink as antifoaming agents or surface tension reducing agents or the like.

Examples of antioxidants that may be used include conventional antioxidants such as dibutylhydroxytoluene, propyl gallate, tocopherol, butylhydroxyanisole and nordihydroguaiaretic acid, and these may be used either individually, or in mixtures of two or more different antioxidants.

The ink can be prepared by mixing the various components using any appropriate dispersion device such as a ball mill or a beads mill or the like. For example, the ink can be produced by first preparing a pigment dispersion comprising the pigment, the pigment dispersant and the non-aqueous solvent, and then adding additional non-aqueous solvent and any other optional components. The non-aqueous solvent (or diluting solvent) used during preparation of the pigment dispersion is preferably the same as the non-aqueous solvent incorporated within the ink, and in those cases where the dispersant is synthesized by solution polymerization, is preferably the same as the polymerization solvent.

The ink according to the present invention can be used favorably within an inkjet recording apparatus. When used as an inkjet ink, the ideal range for the viscosity of the ink varies depending on factors such as the diameter of the discharge head nozzles and the discharge environment, but at 23° C. is typically within a range from 5 to 30 mPa·s, and preferably from 5 to 15 mPa·s, and is most preferably approximately 10 mPa·s. Here, the viscosity is measured at 23° C. by raising the shear stress from 0 Pa at a rate of 0.1 Pa/s, and refers to the measured value at 10 Pa.

The ink according to the present invention can be used favorably within inkjet recording systems. The inkjet printer may employ any of various printing systems, including piezo systems and electrostatic systems. In those cases where an inkjet recording apparatus is used, the ink according to the present invention is discharged from the inkjet head based on a digital signal, and the discharged ink droplets are adhered to a recording medium.

A printed item according to the present invention is an item printed using the ink of the present invention described above. By using the ink according to the present invention, a printed item of high print density can be obtained.

Because the non-aqueous pigment ink of the present invention comprises a combination of a specific pigment dispersant and a specific pigment derivative, the ink repellency of the nozzle plate surface of the print head can be favorably maintained, and a superior image density can be obtained.

EXAMPLES

A more detailed description of the present invention is provided below based on a series of examples, although the present invention is in no way limited by these examples.

<Ink Preparation>

The components listed in Table 1 were premixed in the proportions listed in Table 1 to form a series of liquid preparations. For each of the obtained liquid preparations, 30 g of the liquid preparation was placed in a glass container, 80 g of zirconia beads (diameter: 0.5 mm) were added to the container, and the liquid preparation was dispersed for 2 hours using a rocking mill (RMO5S, manufactured by Seiwa Technical Lab Co., Ltd.) at a frequency of 60 Hz, thus completing preparation of inks for a series of examples and comparative examples. The blend amounts for the components within Table 1 represent mass % values.

The components listed in Table 1 are as follows.

Carbon black MA11: manufactured by Mitsubishi Chemical Corporation

Carbon black MA8: manufactured by Mitsubishi Chemical Corporation

S5000: a phthalocyanine pigment derivative, manufactured by The Lubrizol Corporation V-216: an alkylated PVP (product name: Antaron V-216, manufactured by ISP Japan Ltd., a VP-hexadecene copolymer, copolymerization ratio 2:8, weight average molecular weight: $14 \times 10^3$)

S11200: a graft PN (product name: Solsperse 11200, manufactured by The Lubrizol Corporation, solid fraction within an aliphatic solvent: 50% by mass (the blend amount in Table 1 is also listed as a solid fraction amount))

S 13940: a graft PN (product name: Solsperse 13940, manufactured by The Lubrizol Corporation, solid fraction within an aliphatic solvent: 40% by mass (the blend amount in Table 1 is also listed as a solid fraction amount))

Disperbyk-101: a salt of a long-chain polyaminoamide and a polar acid ester, manufactured by BYK Japan Co., Ltd.

Isomyristyl alcohol: a higher alcohol-based solvent (product name: FOC140N, manufactured by Nissan Chemical Industries, Ltd., number of carbon atoms: 14)

Isooctyl palmitate: an ester-based solvent (product name: Nikkol IOP, manufactured by Nikko Chemicals Co., Ltd.)

AF4: a petroleum-based hydrocarbon solvent (product name: AF Solvent No. 4 (a naphthene-based solvent), manufactured by Nippon Oil Corporation)

stability, and stability within the printer. The results of these evaluations are shown in Table 1.

In each evaluation, where necessary, an inkjet printer "Orphis HC5500" (manufactured by Riso Kagaku Corporation) was used as the inkjet recording apparatus. The HC5500 is a system that uses a 300 dpi line-type inkjet head (in which the nozzles are aligned with an approximately 85 μm spacing therebetween), wherein the paper is transported in a sub-scanning direction perpendicular to the main scanning direction (the direction along which the nozzles are aligned) while printing is conducted.

(Ink Viscosity)

TABLE 1

Ink compositions and evaluations

| | | | Example | | | | | | |
|---|---|---|---|---|---|---|---|---|---|
| (Mass %) | | | 1 | 2 | 3 | 4 | 5 | 6 | 7 |
| Pigment | Carbon black MA11 | | 7.20 | — | 7.20 | 7.20 | — | 7.20 | 7.20 |
| | Carbon black MA8 | | — | 7.20 | — | — | 7.20 | — | — |
| Pigment derivative | S5000 | | 0.50 | 0.20 | 0.60 | 0.40 | 0.40 | 0.50 | 0.40 |
| Pigment dispersant | Alkylated PVP | V-216 | 3.20 | 2.50 | 2.40 | 2.20 | 2.40 | 2.40 | 3.50 |
| | Graft PN | S11200 (solid fraction) | — | — | 1.80 (0.90) | 2.10 (1.05) | 1.90 (0.95) | 1.90 (0.95) | — |
| | | S13940 (solid fraction) | — | 1.70 (0.68) | — | — | — | — | 0.90 (0.36) |
| | Disperbyk-101 | | — | — | — | — | — | — | — |
| Non-aqueous solvent | Isomyristyl alcohol | | 7.00 | 9.00 | 5.00 | 9.00 | 7.00 | — | 9.00 |
| | Isooctyl palmitate | | 42.10 | 39.40 | 43.00 | 39.10 | 41.10 | 55.00 | 39.00 |
| | AF4 | | 40.00 | 40.00 | 40.00 | 40.00 | 40.00 | 33.00 | 40.00 |
| Total | | | 100.00 | 100.00 | 100.00 | 100.00 | 100.00 | 100.00 | 100.00 |
| Alkylated PVP:Graft PN (mass ratio) * | | | — | 1:0.27 | 1:0.38 | 1:0.48 | 1:0.40 | 1:0.40 | 1:0.10 |
| Mass ratio of pigment derivative relative to value of 1 for pigment | | | 0.069 | 0.028 | 0.083 | 0.056 | 0.056 | 0.069 | 0.056 |
| Evaluations | Nozzle plate ink repellency | | A | B | A | A | A | B | A |
| | Image density | | A | A | A | A | A | A | A |
| | Low-temperature storage stability | | A | A | B | A | A | A | A |
| | Stability within printer | | B | A | A | A | A | A | B |

| | | | Example | | Comparative example | | | | |
|---|---|---|---|---|---|---|---|---|---|
| (Mass %) | | | 8 | 9 | 1 | 2 | 3 | 4 | 5 |
| Pigment | Carbon black MA11 | | — | — | 7.20 | — | — | — | 7.20 |
| | Carbon black MA8 | | 7.20 | 7.20 | — | 7.20 | 7.20 | 7.20 | — |
| Pigment derivative | S5000 | | 0.40 | 0.40 | — | 0.50 | — | — | 0.40 |
| Pigment dispersant | Alkylated PVP | V-216 | 3.00 | 1.70 | 2.40 | — | 3.50 | — | — |
| | Graft PN | S11200 (solid fraction) | — | 1.90 (0.95) | 1.90 (0.95) | 3.90 (1.95) | — | — | 3.30 (1.65) |
| | | S13940 (solid fraction) | 1.30 (0.52) | 0.70 (0.28) | — | — | — | — | — |
| | Disperbyk-101 | | — | — | — | — | — | 3.50 | 1.00 |
| Non-aqueous solvent | Isomyristyl alcohol | | 7.00 | 15.00 | 9.00 | 10.00 | 8.00 | 12.00 | 9.00 |
| | Isooctyl palmitate | | 41.10 | 33.10 | 39.50 | 38.40 | 41.30 | 41.30 | 39.10 |
| | AF4 | | 40.00 | 40.00 | 40.00 | 40.00 | 40.00 | 36.00 | 40.00 |
| Total | | | 100.00 | 100.00 | 100.00 | 100.00 | 100.00 | 100.00 | 100.00 |
| Alkylated PVP:Graft PN (mass ratio) * | | | 1:0.17 | 1:0.72 | 1:0.40 | — | — | — | — |
| Mass ratio of pigment derivative relative to value of 1 for pigment | | | 0.056 | 0.056 | — | 0.069 | — | — | 0.056 |
| Evaluations | Nozzle plate ink repellency | | A | A | C | A | C | B | A |
| | Image density | | A | A | A | C | A | C | C |
| | Low-temperature storage stability | | A | A | A | C | A | C | C |
| | Stability within printer | | A | A | A | C | A | C | C |

* Calculated using solid fraction amounts

<Evaluations>

Each of the inks obtained from the above examples and comparative examples was evaluated for ink viscosity, nozzle plate ink repellency, image density, low-temperature storage The viscosity of each of the obtained inks (namely, the viscosity at 10 Pa when the shear stress was raised from 0 Pa at a rate of 0.1 Pa/s at a temperature of 23° C.) was measured using a controlled stress rheometer RS75 manufactured by Haake GmbH (cone angle: 1°, diameter: 60 mm).

The results revealed that each of the inks had a viscosity within a range from 8 to 12 mPa·s, which is an ideal viscosity for use in inkjet printing. Moreover, all of the obtained inks had a pigment particle size that fell within the preferred range for inkjet printing.

(Nozzle Plate Ink Repellency)

Following preparation of the above inks, each ink was loaded into the inkjet printer Orphis HC5500, the cleaning maintenance operation was performed 1,000 times, and the ink repellency of the nozzle plate surface was evaluated. The cleaning maintenance operation was performed by executing the "normal cleaning" operation that represents one of the cleaning modes provided within the Orphis HC5500. In this "normal cleaning" operation, the ink pathway was pressurized to expel any ink from the head nozzles, and a rubber wiper blade was wiped across the nozzle surface while a suction system was used to suck any residual ink off the nozzle plate surface. The ink repellency of the nozzle plate surface was evaluated by inspecting the nozzle surface visually to determine whether any ink remained on the nozzle plate surface. The nozzle plate ink repellency was then evaluated against the criteria below.

A: ink repellency was retained even after 1,000 repetitions of the cleaning maintenance operation B: ink repellency disappeared after at least 500 repetitions, but before 1,000 repetitions of the cleaning maintenance operation C: ink repellency disappeared before 500 repetitions of the cleaning maintenance operation (Image Density)

Each ink was loaded into the inkjet printer Orphis HC5500, and a solid image equivalent to 150 dpi was printed using liquid droplets of 42 pl. After standing for 24 hours, the image density was evaluated by measuring the OD value for the surface of the printed item. Plain paper (Riso lightweight paper, manufactured by Riso Kagaku Corporation) was used as the printing paper.

The density (OD value) of each image was measured using a Macbeth densitometer (RD920, manufactured by Macbeth Corporation), and the image density was then evaluated against the criteria below.

A: OD value>1.15
B: OD value≧1.05
C: OD value<1.05

(Low-Temperature Storage Stability)

Following preparation, each ink was left to stand for one month at 5° C., and was then filtered through a polycarbonate filter with a pore size of 2 μm. The residue retained on the filter was inspected under an optical microscope for the presence of foreign matter, and evaluated against the criteria below.

A: no foreign matter
B: a small amount of foreign matter
C: a large amount of foreign matter (Stability within the Printer)

Following preparation, each ink was loaded into the inkjet printer Orphis HC5500, and was then left to stand for 3 months in an atmosphere at 35° C. During this time, the inkjet head nozzles were not sealed, and volatilization of the solvent within the ink was able to proceed. After the standing period, the "strong cleaning" operation that represents one of the cleaning modes provided within the Orphis HC5500 was executed once at 20° C., and solid printing was then performed onto paper (Riso paper IJ, manufactured by Riso Kagaku Corporation). If the ink failed to be discharged from one or more of the head nozzles (resulting in the appearance of white bands within the printed image), then the "strong cleaning" operation was performed once more, and the solid printing was repeated. This series of operations was repeated as necessary. The "strong cleaning" involves the same operations as the "normal cleaning" described above, with the exception that the pressure applied to the ink pathway is greater. The ink stability within the printer was evaluated against the criteria below.

A: no discharge faults (white bands within the printed image) occurred after the second strong cleaning operation B: no discharge faults occurred after the third strong cleaning operation C: discharge faults occurred even after the fourth strong cleaning operation Each of the inks of the examples exhibited favorable results for the nozzle plate ink repellency, the image density, the low-temperature storage stability, and the stability within the printer.

The inks of examples 1, 3 to 5, 7 and 8 each contained an appropriate amount of the pigment derivative and an appropriate amount of the higher alcohol, and the nozzle plate ink repellency for these inks was even more favorable.

The inks of examples 1, 2, and 4 to 9 each contained an appropriate amount of the pigment derivative, and the low-temperature storage stability for these inks was even more favorable. In example 3, it is thought that because the amount of the pigment derivative was large, some foreign matter was produced, resulting in a deterioration in the low-temperature storage stability.

The inks of examples 2 to 6, 8 and 9 each contained an appropriate amount of the alkylated PVP, and the stability within the printer of these inks was particularly favorable.

The inks of comparative examples 1 and 3 contained no added pigment derivative, and the nozzle plate ink repellency was poor.

The ink of comparative example 2 contained no added alkylated PVP, and the image density, the low-temperature storage stability, and the stability within the printer were all poor. It is thought that these observations indicate that the stability of the pigment derivative within the ink could not be maintained, resulting in a deterioration in the pigment dispersibility.

The inks of comparative examples 4 and 5 contained no added alkylated PVP, but rather used a conventional pigment dispersant. However, the image density, the low-temperature storage stability, and the stability within the printer were all poor. The comparative example 4 also contained no added pigment derivative, and as a result the nozzle plate ink repellency also deteriorated.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A non-aqueous pigment ink comprising a pigment, a pigment
dispersant and a non-aqueous solvent, wherein
the ink comprises a copolymer of vinylpyrrolidone and an alkene of 10 to 40 carbon atoms as the pigment dispersant, and also comprises a pigment derivative
wherein the mass ratio between the pigment derivative and the copolymer of vinylpyrrolidone and an alkene of 10 to 40 carbon is within a range of 1:4 to 1:12.5.

2. The non-aqueous pigment ink according to claim 1, wherein
an amount of the pigment derivative, expressed as a mass ratio relative to a value of 1 for the pigment, is within a range from 0.015 to 0.150.

3. The non-aqueous pigment ink according to claim 2, wherein
an amount of the pigment derivative, expressed as a mass ratio relative to a value of 1 for the pigment, is within a range from 0.030 to 0.080.

4. The non-aqueous pigment ink according to claim 1, wherein the non-aqueous solvent comprises a higher alcohol of 8 to 24 carbon atoms.

5. The non-aqueous pigment ink according to claim 2, wherein the non-aqueous solvent comprises a higher alcohol of 8 to 24 carbon atoms.

6. The non-aqueous pigment ink according to claim 3, wherein the non-aqueous solvent comprises a higher alcohol of 8 to 24 carbon atoms.

7. The non-aqueous pigment ink according to claim 1, further comprising a nitrogen-containing graft copolymer having polyester side chains as a pigment dispersant.

8. The non-aqueous pigment ink according to claim 2, further comprising a nitrogen-containing graft copolymer having polyester side chains as a pigment dispersant.

9. The non-aqueous pigment ink according to claim 3, further comprising a nitrogen-containing graft copolymer having polyester side chains as a pigment dispersant.

10. The non-aqueous pigment ink according to claim 4, further comprising a nitrogen-containing graft copolymer having polyester side chains as a pigment dispersant.

11. The non-aqueous pigment ink according to claim 5, further comprising a nitrogen-containing graft copolymer having polyester side chains as a pigment dispersant.

12. The non-aqueous pigment ink according to claim 6, further comprising a nitrogen-containing graft copolymer having polyester side chains as a pigment dispersant.

13. The non-aqueous pigment ink according to claim 7, wherein
a mass ratio between the copolymer of vinylpyrrolidone and an alkene of 10 to 40 carbon atoms, and the nitrogen-containing graft copolymer having polyester side chains, is within a range from 1:0.10 to 1:0.85.

14. The non-aqueous pigment ink according to claim 8, wherein
a mass ratio between the copolymer of vinylpyrrolidone and an alkene of 10 to 40 carbon atoms, and the nitrogen-containing graft copolymer having polyester side chains, is within a range from 1:0.10 to 1:0.85.

15. The non-aqueous pigment ink according to claim 9, wherein a mass ratio between the copolymer of vinylpyrrolidone and an alkene of 10 to 40 carbon atoms, and the nitrogen-containing graft copolymer having polyester side chains, is within a range from 1:0.10 to 1:0.85.

16. The non-aqueous pigment ink according to claim 10, wherein
a mass ratio between the copolymer of vinylpyrrolidone and an alkene of 10 to 40 carbon atoms, and the nitrogen-containing graft copolymer having polyester side chains, is within a range from 1:0.10 to 1:0.85.

17. The non-aqueous pigment ink according to claim 11, wherein
a mass ratio between the copolymer of vinylpyrrolidone and an alkene of 10 to 40 carbon atoms, and the nitrogen-containing graft copolymer having polyester side chains, is within a range from 1:0.10 to 1:0.85.

18. The non-aqueous pigment ink according to claim 12, wherein
a mass ratio between the copolymer of vinylpyrrolidone and an alkene of 10 to 40 carbon atoms, and the nitrogen-containing graft copolymer having polyester side chains, is within a range from 1:0.10 to 1:0.85.

19. The non-aqueous pigment ink according to claim 13, wherein
a mass ratio between the copolymer of vinylpyrrolidone and an alkene of 10 to 40 carbon atoms, and the nitrogen-containing graft copolymer having polyester side chains, is within a range from 1:0.17 to 1:0.75.

20. A printed item printed using the non-aqueous pigment ink according to claim 1.

* * * * *